United States Patent [19]

Kist

[11] Patent Number: 5,009,317

[45] Date of Patent: Apr. 23, 1991

[54] ANIMAL TRAP WITH SANITARY HANDLING MEANS

[76] Inventor: William J. Kist, 337 Roberts Rd., Barrington, Ill. 60010

[21] Appl. No.: 585,250

[22] Filed: Sep. 19, 1990

[51] Int. Cl.⁵ .............................................. B65D 73/00
[52] U.S. Cl. ......................................... 206/466; 43/81; 43/96; 206/806; 206/320
[58] Field of Search ............... 43/96, 81, 58; 206/320, 206/466, 806, 45.33

[56] References Cited

U.S. PATENT DOCUMENTS

| | | | |
|---|---|---|---|
| 1,995,344 | 3/1935 | Gebhard | 43/81 |
| 2,544,475 | 3/1951 | Uttz | 43/81 |
| 2,595,809 | 5/1952 | Oxley | 43/96 X |
| 3,097,788 | 7/1963 | Nichols | 206/45.33 X |
| 3,395,792 | 8/1968 | Larson | 206/466 X |

Primary Examiner—Richard K. Seidel
Assistant Examiner—Patty E. Hong
Attorney, Agent, or Firm—Leydig, Voit & Mayer

[57] ABSTRACT

A mouse trap having a flexible handle made of a thin strip of plastic material and normally extending in upright relation from one end of the trap so as not to impede access to the trigger of the trap by a mouse nor movement of the trapping bail between its latched and sprung positions. The handle is sufficiently flexible to permit handling and transport of the trap by grasping an upper end of the handle with the base and trapped mouse suspended in depending relation from the lower end of the handle. The handle also is bendable into closely overlapping relation to the top side of the trap to permit compact containment of the trap in conventional packaging.

12 Claims, 1 Drawing Sheet

ANIMAL TRAP WITH SANITARY HANDLING MEANS

FIELD OF THE INVENTION

The present invention relates generally to animal traps, and more particularly, to a mousetrap which permits sanitary handling and disposal.

BACKGROUND OF THE INVENTION

Although commercially available mousetraps are reusable, the trapping and killing of a mouse contaminates the trap, making such reuse undesirable. While various proposals have been made for facilitating handling of mousetraps so as to reduce contact with the killed mouse, such proposals often have been relatively complex and bulky in design, appreciably increase the cost of the device, and encumber packaging and marketing of the trap. Indeed, conventional mousetraps are relatively low cost items which typically are packaged in small cellophane bags or blister seal packs that are displayed on hanger racks in hardware stores or supermarkets for easy access. Bulky and more complex devices impede such packaging and marketing of the trap.

OBJECT AND SUMMARY OF THE INVENTION

It is an object of the present invention to provide a mousetrap that permits more sanitary handling of the trap, but does not appreciably increase the cost or complexity of the device.

Another object is to provide a mousetrap as characterized above which may be easily packaged in cellophane or blister pack hanger type containers in a conventional manner for easy display and access to customers in stores in which they are sold.

Other objects and advantages of the invention will become apparent upon reading the following detailed description and upon reference to the drawings, in which:

Figure 1:
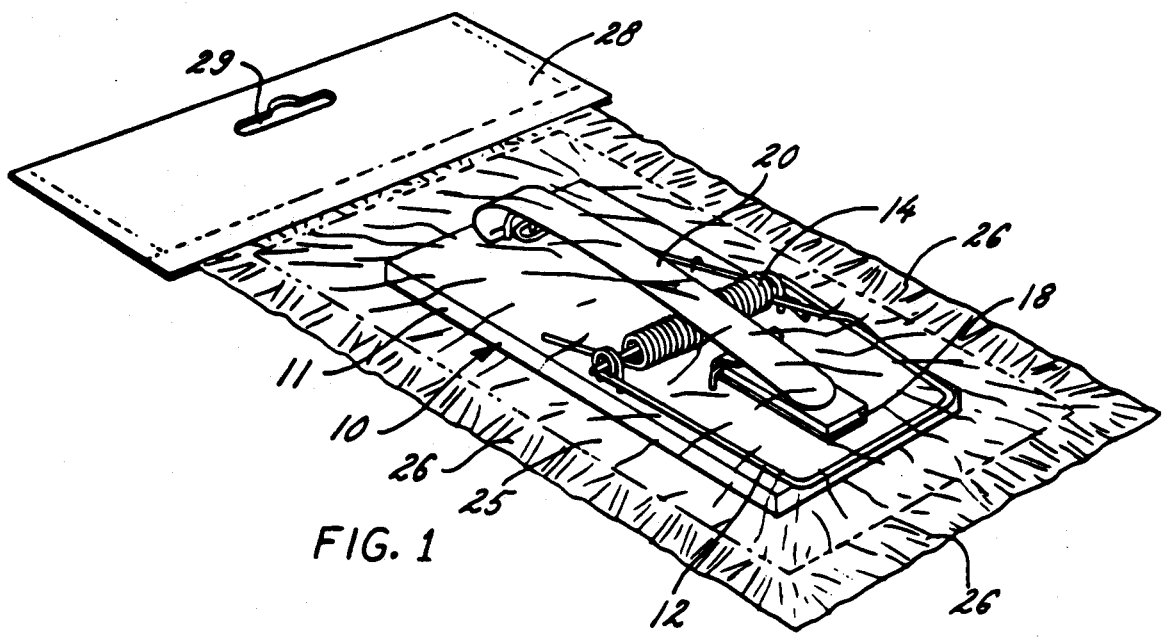
FIG. 1 is a perspective of an illustrated mousetrap embodying the present invention shown in packaged condition.

While the invention is susceptible of various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention. Although the invention primarily relates to a rodent trap, such as a mousetrap, it will be understood that it could be utilized in association with traps for other animals.

DESCRIPTION OF THE PREFERRED EMBODIMENT

Referring now more particularly to the drawings, there is shown an illustrative mousetrap 10 embodying the present invention. The mousetrap 10 comprises a base 11 which may be in the form of a rectangular wooden piece upon which a "U"-shape bail 12 is pivotably secured at a central location for movement between a set position, shown in FIG. 2, and a sprung position shown in FIG. 3. A coiled spring 14 normally urges the bail 12 to the sprung position, and a latch 15 pivotably secured at one end of the base 11 by a U-shaped fastener 16 has a free end that is releasably engageable with a bait carrying trigger 18 in a well known manner to maintain the bail 12 in set position.

Figure 2:
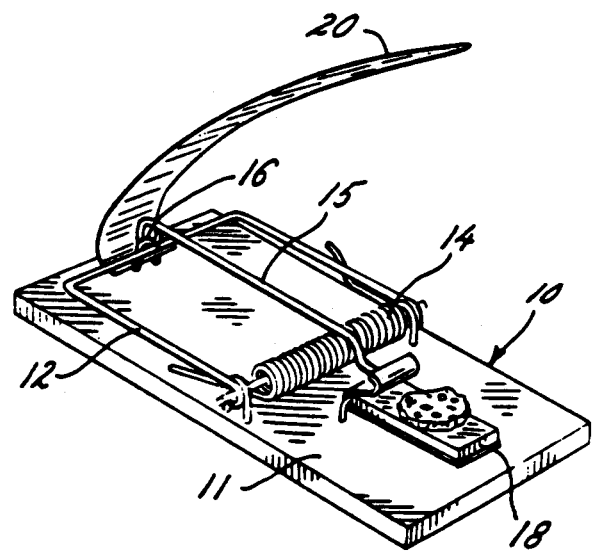
FIG. 2 is a perspective of the illustrated mousetrap in a set condition.
Figure 3:
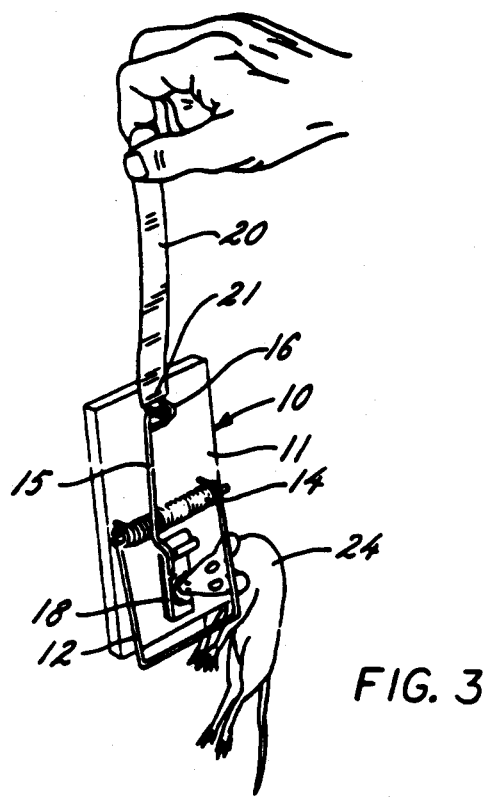
FIG. 3 is a perspective showing the mousetrap being handled after trapping and killing a mouse.

In accordance with the invention, the trap has a flexible handle extending in generally upright condition from the base so as not to hinder operation of the trap nor impede access to bait by a mouse, while enabling sanitary handling of the trap both following trapping of a mouse and during reuse of the trap. To this end, in the illustrated embodiment, a flexible handle 20 comprising a thin strip of relatively thin gauge plastic is affixed at one end to the base 11 adjacent the latch mounting fastener 16 by means of a staple 21 or the like. Alternatively, the plastic strip could be secured to the base by the latch mounting fastener 16. The plastic strip 20 in this case is mounted on the top of the base and is bent so as to extend in upstanding relation to the base. The plastic strip 20 preferably has sufficient memory upon bending so as to stay in the generally upright condition during use of the trap, as shown in FIG. 2. In such condition, it will be seen that the handle 20 does not impede movement of the bail 12 between its latched and sprung positions. Following trapping of a mouse 24, the trap 10 may be handled simply by grasping the upper end of the handle 20, as shown in FIG. 3, and upon lifting of the trap 10 by the handle 20, the flexibility of the handle will permit the trap 10 and the mouse 24 to hang in depending relation from the handle for sanitary transport of the trap and mouse to a disposal area.

In carrying out the invention, the flexible handle is bendable from its normal upright condition to a position in closely overlying relation to the top of the trap so as to permit packaging of the trap in a conventional manner. In the illustrated embodiment, as shown in FIG. 1, the trap 10 is packaged in a relatively flat celophane package 25 formed by heat sealed marginal edges 26 and having a label 28 at one end formed with an aperture 29 that permits supporting of the package on a hanger type display rack in a store in which it is sold. The marginal sealed areas 26 of the package 25 may be in close proximity to the perimeter of the rectangular wooden base 11 and the thickness of the package corresponds substantially to the vertical height of the trap 10. It will be appreciated that other similar packaging modes, such as blister seal packs and the like, could be used. The plastic material of the handle 20 has sufficient flexibility to permit positioning closely against the top of the trap 10 when packaged (FIG. 1), and sufficient memory to resume and maintain its substantially upright position during use of the trap, as shown in FIG. 2.

From the foregoing, it can be seen that the flexible handle neither impedes packaging of the trap, access to the baited trigger by a mouse, nor operation of the trap. Once a mouse has been killed in the trap, the handle permits sanitary handling and transport of the trap to a disposal area with the flexibility of the handle enabling the trap and the mouse secured therein to hang in depending relation from the bottom of the handle. The handle permits similar handling of the trap during reusage. Since the handle comprises merely a thin strip of plastic that can be easily stapled or otherwise affixed to the base of a conventional mousetrap, it does not appreciably increase the cost or complexity of the device.

What is claimed is:

1. An animal trap comprising
   a base,
   a "U"-shaped bail,
   means mounting said bail on said base for pivotable movement between a latched position and a sprung position,
   means biasing said bail toward said sprung position,
   a trigger,
   latch mounted on said base for releasable engagement with said trigger for maintaining said bail in said latched position, and
   a flexible handle normally extending in upright relation to said base so as not to impede access to said trigger by a mouse nor movement of said bail from said latched to said sprung positions, said handle being bendable so as to permit handling and transport of said trap by grasping an upper end of said handle with said base and a mouse trapped thereon suspended in depending relation from a lower end of said handle.

2. The animal trap of claim 1 in which said trigger is located adjacent one end of said base, and said handle is mounted on said base adjacent an end opposite that said trigger is located.

3. The animal trap of claim 1 including means pivotably securing said latch to said base adjacent one end of said base, and said handle being secured to said base adjacent said latch securing means.

4. The animal trap of claim 1 in which said handle is a strip of thin gauge plastic material, and means for affixing one end of said strip to said base.

5. The animal trap of claim 4 in which said plastic strip is affixed to a top side of said base and during use extends in substantially perpendicular relation to said top side.

6. The animal trap of claim 5 in which said handle is bendable from said upright position into close overlying relation to a top side of said base to facilitate containment of said trap.

7. The animal trap of claim 2 in which said handle affixing means is a staple.

8. The animal trap of claim 7 in which said strip is affixed by said staple to a top side of said base.

9. A packaged animal trapping device comprising a trap having a base, a "U"-shaped bail, means mounting said bail on said base for pivotable movement between a latched position and a sprung position, means biasing said bail toward said sprung position, a trigger, latch mounted on said base for releasable engagement with said trigger for maintaining said bail in said latched position, a package containing said trap, a handle affixed to said base and being formed of flexible material that is bendable into close overlapping relation to a top side of said base and is retained in such position within said package and upon removal of said trap from said package said handle is positionable into upstanding relation to said base so as not to impede access to said trigger by an animal nor movement of said bail from said latched to said sprung positions.

10. The packaged animal trap of claim 9 in which said package is a cellophane bag.

11. The packaged animal trap of claim 10 in which said cellophane bag has heat-sealed marginal edges in close proximity about the perimeter of the base of said trap.

12. The packaged animal trap of claim 10 in which said package has an apertured end to permit supporting thereof on a hanger rack.

* * * * *